(12) United States Patent
Obaidi et al.

(10) Patent No.: US 10,360,437 B2
(45) Date of Patent: Jul. 23, 2019

(54) COLLISION AVOIDANCE SYSTEM FOR AUGMENTED REALITY ENVIRONMENTS

(71) Applicant: T-Mobile USA, Inc., Bellevue, WA (US)

(72) Inventors: Ahmad Arash Obaidi, San Ramon, CA (US); Eric Wayne Yocam, Sammamish, WA (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

(21) Appl. No.: 15/604,548

(22) Filed: May 24, 2017

(65) Prior Publication Data
US 2018/0276969 A1   Sep. 27, 2018

Related U.S. Application Data

(60) Provisional application No. 62/475,035, filed on Mar. 22, 2017.

(51) Int. Cl.
| G06K 9/00 | (2006.01) |
| G08G 9/02 | (2006.01) |
| G08G 1/005 | (2006.01) |
| G08G 1/16 | (2006.01) |
| G06K 9/22 | (2006.01) |

(52) U.S. Cl.
CPC ..... *G06K 9/00201* (2013.01); *G06K 9/00604* (2013.01); *G06K 9/00671* (2013.01); *G06K 9/00979* (2013.01); *G06K 9/22* (2013.01); *G08G 1/005* (2013.01); *G08G 1/165* (2013.01); *G08G 1/166* (2013.01); *G08G 9/02* (2013.01)

(58) Field of Classification Search
CPC ............ G08B 21/0476; G08B 13/1427; G08B 13/1436; G08B 13/19647; G08B 21/0277; G08B 25/08; G08B 21/0415; G08B 25/016; G08B 25/10
See application file for complete search history.

(56) References Cited

U.S. PATENT DOCUMENTS

| 2010/0191453 A1* | 7/2010 | Cameron | G01C 21/3492 701/533 |
| 2012/0194554 A1* | 8/2012 | Kaino | G08B 13/19613 345/633 |
| 2013/0293586 A1* | 11/2013 | Kaino | G08G 1/005 345/633 |
| 2015/0019266 A1* | 1/2015 | Stempora | G06Q 40/08 705/4 |
| 2015/0248772 A1* | 9/2015 | Gove | H04N 5/247 348/158 |
| 2017/0089710 A1* | 3/2017 | Slusar | B60R 1/00 |

* cited by examiner

*Primary Examiner* — Kabir A Timory
(74) *Attorney, Agent, or Firm* — Lee & Hayes, P.C.

(57) ABSTRACT

A collision avoidance system within an augmented reality environment determines a hazard and notifies the user of the hazard. By determining that the attention of the user is focused on the mobile computing device, and that there is a hazardous condition that the user is approaching, the device provides an alert to the user as to the hazardous condition to protect the user from the hazard. Known hazardous conditions can be stored and provided to a mobile computing device when that mobile computing device is within the vicinity of the known hazardous conditions. The system can also create geofences and provide notifications to the user when a boundary is approached or crossed.

20 Claims, 5 Drawing Sheets

COLLISION AVOIDANCE SYSTEM FOR AUGMENTED REALITY ENVIRONMENTS

CROSS REFERENCE TO RELATED APPLICATION

This patent application claims the benefit of U.S. Provisional Patent Application Ser. No. 62/475,035 filed Mar. 22, 2017, entitled "COLLISION AVOIDANCE SYSTEM FOR AUGMENTED REALITY ENVIRONMENTS", which is hereby incorporated in its entirety by reference.

BACKGROUND

The increasing technological advances in mobile wireless communication devices has led to a corresponding increase in the variety of uses for such devices. One particular use for mobile wireless communication devices that utilizes some of the technological advances that have found their way into such devices is for presenting augmented reality and even virtual reality environments to the user. For example, a device may provide a display to a user in which the user can visualize the physical world around them that has been augmented by the inclusion of one or more computer-generated objects that are not actually present in the physical world. Similarly, a virtual reality experience may provide the user a display that provides a virtual world in which the user is able to physically move around, such as by walking around, to explore.

One issue with augmented reality and virtual reality environments is that the user may devote the majority of his attention to the display provided by the device, and may not pay sufficient attention to the physical world around him as he moves. This can lead to the user encountering hazards, striking objects, wandering outside a predefined area, or getting hurt.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
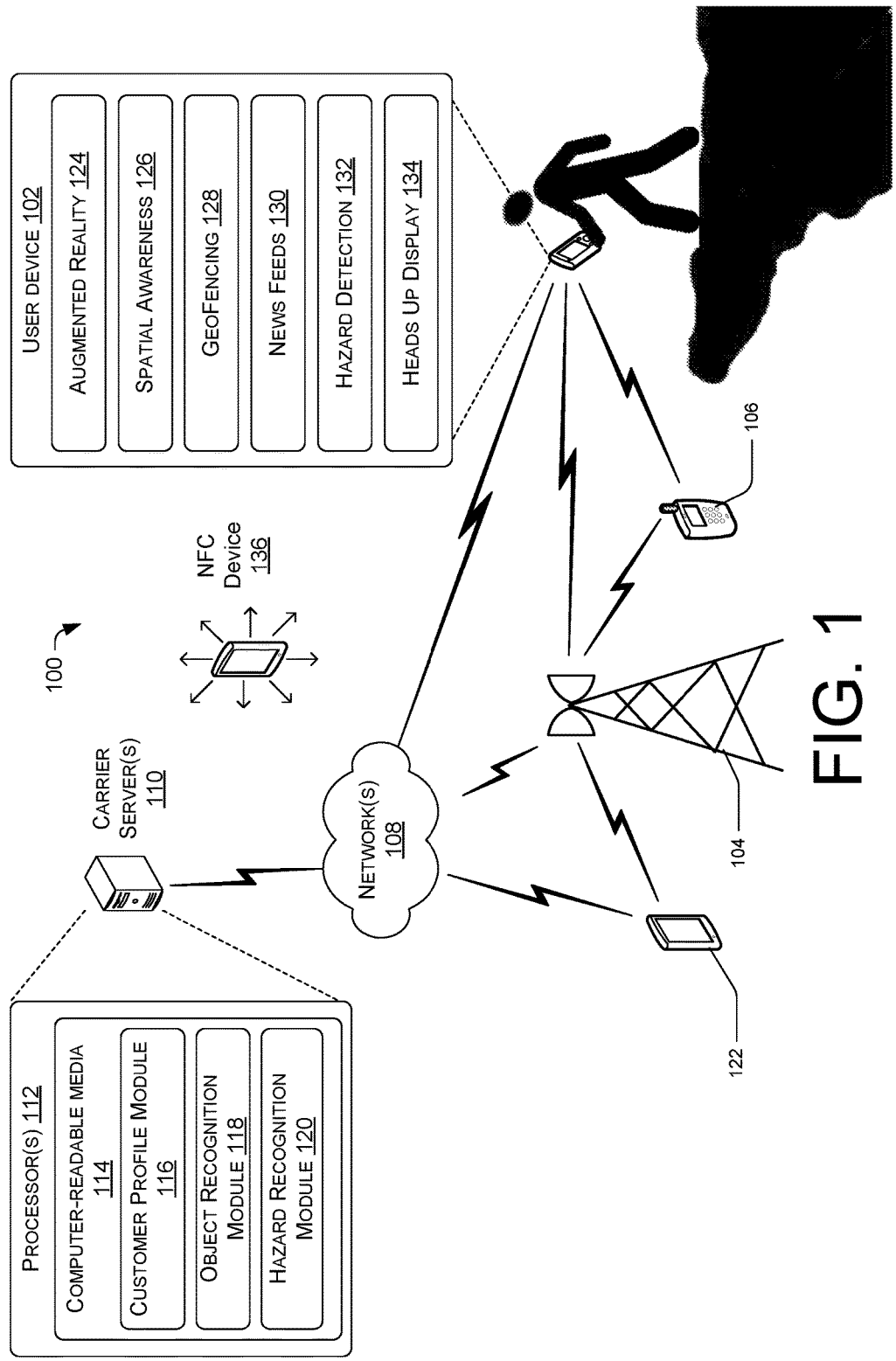
FIG. 1 illustrates an overview of a system for providing a collision avoidance system for augmented reality environments.

This disclosure describes, in part, a system and method for providing a collision avoidance notification to a user engaged in an augmented reality, or virtual reality, environment. While the system and methods described herein are applicable to both augmented reality and virtual reality environments, for efficiency, the disclosure will use augmented reality ("AR") as an example but not in an exclusive sense. Augmented reality results when a computer-generated image is superimposed on a user's view of the physical world. The resulting composite view may be a live direct or indirect view of the physical world around a user. Such a live direct view may be considered a real-time view, that is, the view displayed to the user is provided as quickly as the hardware and software is able to capture, process, and display the view taking into consideration latency and processing time in displaying the view. In many such real-time views, there is no noticeable delay (or only very minor delays) that are perceptible to a human observer.

In many instances, an AR environment allows a user to move about in the physical world and the computer-generated superimpositions may change as the user moves around. In fact, a form of gaming may involve a user searching for virtual objects or characters (collectively, "virtual objects"), and moving toward these virtual objects allows the user to collect or otherwise interact with the virtual objects.

An AR application is one in which an augmented reality is presented to the user, and the AR application allows the user to find, collect, or use the virtual objects presented to the user. A user may receive points, unlock rewards, progress to a new challenge, or be provided some sort of incentive or reward for finding the virtual objects.

One potential issue arises when a user pays a majority of her attention to the virtual objects presented in the display and not sufficient attention on the physical world around her. In many cases, a user walks around the physical world while holding a mobile computing device, such as a smart phone, and looks down at the smart phone in her hand. The user may be unaware of obstacles, boundaries, or hazards that can interfere with the users' mobility or cause harm to the user. Some example hazards may include fences, walls, buildings, motor traffic, other pedestrians, holes in the ground, cliffs, or other types of man-made or natural obstacles that may cause the user harm if the user walks unaware into, over, or through such hazards.

To alleviate the potential for harm to a user who looks down at the AR environment while moving around, the described system is able to determine that a user is viewing an AR environment and can further determine that a user is looking down at their mobile computing device while moving around. The described system is further able to determine the location of the mobile computing device, and may determine a motion vector associated with the mobile computing device which comprises a direction and velocity of motion.

In some cases, the system detects objects in the physical world, such as through machine vision and object recognition algorithms. The system may additionally or alternatively be provided information regarding known objects or hazards in the vicinity of the mobile computing device. In some examples, a wireless carrier to which the mobile computing device subscribes provides locations of known hazards. In other instances, the mobile computing device communicates peer-to-peer with other mobile computing devices in the vicinity to learn the location and identification of hazards. The mobile computing device may also communicate with objects configured with near field communication capabilities, such as radio frequency identification ("RFID") tags, which can broadcast information related to hazards.

The mobile computing device may additionally create a three dimensional model of the physical world by capturing image data through one or more imaging sensors and convert this imaging data to a three dimensional model from which the mobile computing device may identify objects and hazards. The mobile computing device may additionally be provided with news feed information that may indicate hazards or obstacles, such as a fire, a robbery, a sink hole, a riot, or other such information that may indicate a location the user may wish to avoid.

The mobile computing device may also be able to determine artificial boundaries beyond which the user is not to venture. In some aspects, geofencing allows the mobile computing device to determine when a user has wandered beyond an artificial boundary and provide feedback to the user indicating that the user is approaching, or has wandered outside, the determined boundary. This may be effective, for example, where a parent establishes a geofence around the perimeter of a park while allowing a child to engage in an AR environment and wants the child to stay within the park.

As the mobile computing device determines that a user is approaching a hazard, it may provide an alert to the user of the mobile computing device. The alert may be in one or more various forms, such as showing the user an image within the AR environment of the hazard, haptic feedback, vibration of the mobile computing device, an audible warning, some other visual warning, or the alert could be provided by terminating the AR application.

The mobile computing device may send data to the wireless carrier. The data may be from the AR application in which the augmented reality experience pushes data to the wireless carrier, such as by sending communication to a cloud service. In this way, the wireless carrier can determine where its subscribers are located and use data collected and agglomerated from multiple users to maintain and provide the identification and location of hazardous conditions to its other subscribers.

The mobile computing device is able to determine when a user has their attention directed at the mobile computing device. For example, the mobile computing device may capture image data from one or more image sensors to determine that a user has their head down and their eyes looking at the mobile computing device. Other ways are possible as well, for example, the mobile computing device may interact with one or more other devices, such as one or more wearable devices associated with the user. For instance, the mobile computing device may interact with a smart watch worn by the user and is able to determine that the user has their watch hand raised in front of them while holding the mobile computing device. This information may be used in conjunction with a tilt sensor of the mobile computing device to determine that the user is holding the mobile computing device in front of them. When combined with motion data, the system may determine that a user is paying attention to the mobile computing device while walking or running.

Additionally, motion data may be provided by GPS or through other hardware associated with the mobile computing device such as one or more accelerometers. The system is able to determine user attention such as through the device tilt angle, head position, or eye tracking capabilities. It may further determine surrounding objects, identify hazards, and provide feedback to the user of hazards the user is approaching while the user's attention is directed at the mobile computing device.

According to some embodiments, a method of collision avoidance in an augmented reality environment includes determining that an augmented reality application is executing on a computing device; determining a location of the mobile computing device; determining one or more hazards within a predetermined distance of the location; determining that the mobile computing device is approaching at least one of the one or more hazards; and generating a notification of the at least one of the one or more hazards.

In some cases, determining one or more hazards includes receiving hazard data from a database, or may additionally or alternatively include capturing image data from an image sensor associated with the computing device. In some instances, a notification includes exiting the augmented reality application to turn the attention of the user to the surrounding environment and may indicate the detected hazards. The notification may also include haptic, audio, or visual feedback, or a combination of different sensory feedback mechanisms.

According to some embodiments, an electronic device configured to operate as described herein includes one or more processors; an accelerometer; and an imaging sensor. The electronic device may have instructions stored in memory that cause the one or more processors to determine that the one or more processors are executing an augmented reality application; receive motion data from the accelerometer; determine, based at least in part upon the motion data, that the electronic device is moving; receive imaging data from the imaging sensor; determine, based at least in part upon the imaging data, that a user associated with the electronic device is looking at the electronic device; receive an indication of one or more hazards within a predetermined distance of the electronic device; determine that the user associated with the electronic device is approaching at least one of the one or more hazards; and provide a notification indicating the presence of the at least one of the one or more hazards.

In some instances, the motion data generated by the accelerometer may indicate that the user associated with the electronic device is walking. This may be accomplished, for example, by detecting motion in at least two axes. That is, detecting forward motion in combination with vertical motion. The motion data may be compared with other motion data that is known to indicate walking motion, and can thus be determined to indicate walking. The same may apply to other forms of motion, such as for example, running, riding a bicycle, skateboarding, roller skating, and other types of motion which may indicate a specific mode of transport. Similarly, the motion data may be used to indicate the user is riding in a vehicle.

According to some embodiments, the instructions cause the one or more processors to analyze the imaging data, such as with an object recognition algorithm that has been trained to detect and identify objects. In one case, the object recognition algorithm may be trained to determine the gaze of the user and can be used to determine that the user is looking at the electronic device and not where he is going.

The object recognition algorithm, by analyzing the imaging data, may likewise identify hazards. For example, the object recognition algorithm may be trained to recognize obstacles in a user's path, such as fences, curbs, fountains, cliffs, walls, and other man-made or naturally occurring obstacles In some cases, the electronic device may retrieve the identification and location of the one or more hazards from a hazards database. For example, a central server, or a cloud-base service, may store an agglomeration of known hazards which may be provided to electronic devices within the vicinity of the known hazards. In other cases, hazards may be identified by receiving a near field communication signal, such as from an RFID tag associated with the hazard or from another mobile computing device.

An associated method for collision avoidance may include determining that a mobile computing device is in motion; determining that a user associated with a mobile computing device is looking at the mobile computing device; determining one or more hazards within a predetermined distance of the mobile computing device; determining that the mobile computing device is approaching at least one of the one or more hazards; and providing a notification of the at least one of the one or more hazards.

The identification and location of one or more hazards may be received from any of a number of mobile computing devices and added to a hazards database which can be provided to other mobile computing devices within the vicinity of the hazards.

In some cases, a hazard may be identified through a news feed source. For example, a news feed source may indicate a fire, a collapsing building, felled trees, and other types of hazards.

In other cases, a hazard may include a virtual boundary around the mobile computing device. As an example, a parent may create a virtual boundary (e.g., a geofence) that extends a predetermined distance from the location of the mobile computing device at the time of the virtual boundary creation. In this way, a notification may be provided to the child when the mobile computing device approaches the boundary, which may be referred to as a hazard in this sense.

In some embodiments, the mobile computing device may include a tilt sensor, which can be used to determine that the user is looking at the mobile computing device. This may be combined with imaging data to further determine that the user is paying attention to the mobile computing device.

With the collection and agglomeration of hazard identification and location, a three-dimensional spatial model may be created that locates and identifies known hazards. One or more portions of this three-dimensional spatial model may be provided to a mobile computing device according to the location of the mobile computing device. Additional portions of the three-dimensional model may be provided to the mobile computing device as the mobile computing device moves from one location to another location.

FIG. 1 illustrates an overview of a system 100 for providing a collision avoidance system for augmented reality environments. A mobile computing device 102 is associated with a radio access provider 104 that provides a home network for one or more mobile computing devices 102 and other wireless devices 106.

In various implementations, the radio access provider 104 may comprise any one or more base stations, node Bs, eNode Bs, or wireless access points (e.g., Wi-Fi access points, WiMax access points, etc.). The radio access provider 104 may include components fixing the radio access provider 104 to a location and positioning the radio access provider 104 at that location, such as components of a cell tower. To provide wireless connectivity to the telecommunication network, the radio access provider 104 may be equipped with any number of components, such as radio antennas, transmitter components, receiver components, power amplifiers, combiners, duplexers, encoder components, decoder components, band pass filters, power sources, or control components. The radio access provider 104 may also include one or more carrier servers 110, such as a server or server farm, multiple, distributed server farms, a mainframe, a work station, a personal computer (PC), a laptop computer, a tablet computer, an embedded system, or any other sort of device or devices.

In various implementations, the mobile computing device 102 may be any sort of computing device known in the art that is capable of communicating over one or more frequency bands. Examples of suitable mobile computing devices 102 include a PC, a laptop computer, a tablet computer, a telecommunication device, a smartphone, a cell phone, a personal digital assistant (PDA), a media player, a media center device, a personal video recorder (PVR), an electronic book reader, a camera, a video game console, a kiosk, a wearable computing device, a virtual reality headset, smart glasses, a gaming device, an electronic device for inclusion in vehicles, a gaming device, or any other sort of device.

The radio access provider 104 may maintain one or more carrier servers 110. In some implementations, the carrier servers 110 have one or more processors 112 and computer-readable storage media 114. The computer-readable storage media 114 is non-transitory and may store various instructions, routines, operations, and modules that, when executed, cause the processors to perform various activities. In some implementations, the one or more processors 112 are central processor units (CPU), graphics processing units (GPU) or both CPU and GPU, or any other sort of processing unit. The non-transitory computer-readable storage media may include volatile and nonvolatile, removable and non-removable tangible, physical media implemented in technology for storage of information, such as computer readable instructions, data structures, program modules, or other data. System memory, removable storage, and non-removable storage are all examples of non-transitory computer-readable media. Non-transitory computer-readable storage media may include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the carrier servers 110.

As illustrated in FIG. 1, the computer-readable storage medium of the carrier servers 110 maintains various modules, such as a customer profile module 116, an object recognition module 118, and a hazard recognition module 120. Of course, other modules may be included and may be configured with instructions to carry out various other tasks not further described herein.

The carrier servers 110 may be configured to communicate with a network 108, such as the internet, to send and receive data communications to the mobile computing device 102, to the radio access provider 104, or to other mobile devices 122. Additional servers and devices may be configured to likewise communicate with the network 108.

The mobile computing device 102 contains one or more processors which may be similar or identical to the processors contained in the carrier servers 110, and may additionally have similar memory as described with reference to the carrier servers 110. That is, the memory associated with the mobile computing device 102 is non-transitory and contains modules, programs, or instructions that can be executed to perform various functions.

In combination with the instructions stored within the mobile computing device 102, there is additional hardware that provides the benefits described herein. In some cases, the combination of hardware and software within the mobile computing device 102 allows the mobile computing device 102 to present an augmented reality 124. This may be created, for example, by capturing image data, which may include a live-feed image or sequence of images, such as a video feed, from one or more imaging sensors associated with the mobile computing device 102. The image data is displayed on a display associated with the mobile computing device 102. The augmented reality 124 environment is created by superimposing one or more computer-generated objects onto the image data.

The mobile computing device 102 may be configured to determine spatial awareness 126. That is, the mobile computing device 102 may be able to determine, among other things, its location, speed, tilt, orientation, and direction of movement. In addition, the mobile computing device 102 may be configured to determine objects within its vicinity. In some instances, this is performed by capturing one or more images of the physical environment surrounding the mobile computing device 102. Through the use of object detection algorithms, the mobile computing device 102 can identify objects viewable within the image data. Of course, the object detection algorithms may be stored on the carrier servers 110 and the image data may be sent to the carrier servers 110 for object detection.

The mobile computing device 102 may be configured for geofencing 128. As used herein, a geofence 128 is a virtual perimeter for a physical world geographic area. The geofence may be dynamically generated, such as a radius around a location, or may be a predefined set of boundaries, such as the perimeter of a park or the metes and bounds of a parcel of real property. As used herein, geofencing 128 is the process of creating or identifying the virtual boundary and triggering a response when the mobile computing device 102 approaches or crosses a particular boundary.

The mobile computing device 102 may receive news feeds 130 that can identify hazardous areas or objects. As an example, a news feed 130 may indicate a building that is schedule to be demolished. The mobile computing device 102 may receive the news feed 130 and may identify the area associated with the news feed 130 as a hazardous area and provide notifications or warnings to a user of the mobile computing device 102 to avoid the hazardous areas.

The mobile computing device 102 may be capable of hazard detection 132 which may indicate the presence of hazards in the vicinity of the mobile computing device 102. In some instances, the hazards may be identified by obtaining image data and identifying objects or conditions within the image data that pose a hazard to a user of the mobile computing device 102. Such identifiable hazards may include cliffs, fences, fountains, buildings, trees, or other natural or man-made objects that may interfere with a user who is moving about while not paying sufficient attention to the real world.

A heads up display 134 may be provided to notify or alert a user of a hazardous condition. The heads up display 134 may include an alert or notification on the display device that is providing the augmented reality experience. For example, a detected hazardous condition may trigger a flashing viewable alert, and audible alert, a haptic alert, a virtual reality indicator of the hazard (e.g., a highlighting or circling of the hazard), or may terminate the virtual reality experience to redirect the attention of the user to the hazardous condition.

The mobile computing device 102 may gather information, such as through image data, and may determine objects and hazards or it may send the image data to the carrier servers 110 for image processing, including object detection and hazard detection. In some instances, the object and/or hazard detection is shared by both the mobile computing device 102 and the carrier servers 110. In some cases, the carrier servers 110 maintain a database of known hazards, and deliver data associated with the known hazards to the mobile computing device 102. In some examples, the carrier servers 110 receive location data from the mobile computing device 102, and based upon the location of the mobile computing device 102, the carrier servers 110 transmit data indicating the known hazards to the mobile computing device 102.

In addition to the carrier servers 110 transmitting data to the mobile computing device 102 relating to known hazards, other mobile devices 122 may transmit data to the mobile computing device 102, such as through the radio access provider 104 or through the network 108. In other cases, one or more other wireless devices 106 may communicate with the mobile computing device 102 through peer-to-peer. That is, the devices may communicate directly without sending the communication data through the radio access provider 104 or through the network 108.

Thus, the mobile computing device 102 may receive information pertaining to known hazards by identifying them directly, from the carrier servers 110, such as through the radio access provider 104 or through the network 108, or from other wireless devices such as through peer-to-peer communication. In addition, one or more near field communication (NFC) devices 136 may broadcast information pertaining to the NFC device 136.

As technology moves in the direction of the internet of things (IoT), a greater number of objects and devices are able to communicate with one another. In some instances, even objects such as a fence, a statue, a fountain, or some other man-made or naturally occurring object may be outfitted with communication capabilities. For example, a fence may be outfitted with an RFID tag or chip that broadcasts information that identifies the fence and may include additional information such as the location, length, height, and materials associated with the fence, and so forth. In this way, the NFC device 136 may be used by the mobile computing device 102 to create a three-dimensional model of the physical world or may be used to identify hazards.

Figure 2:
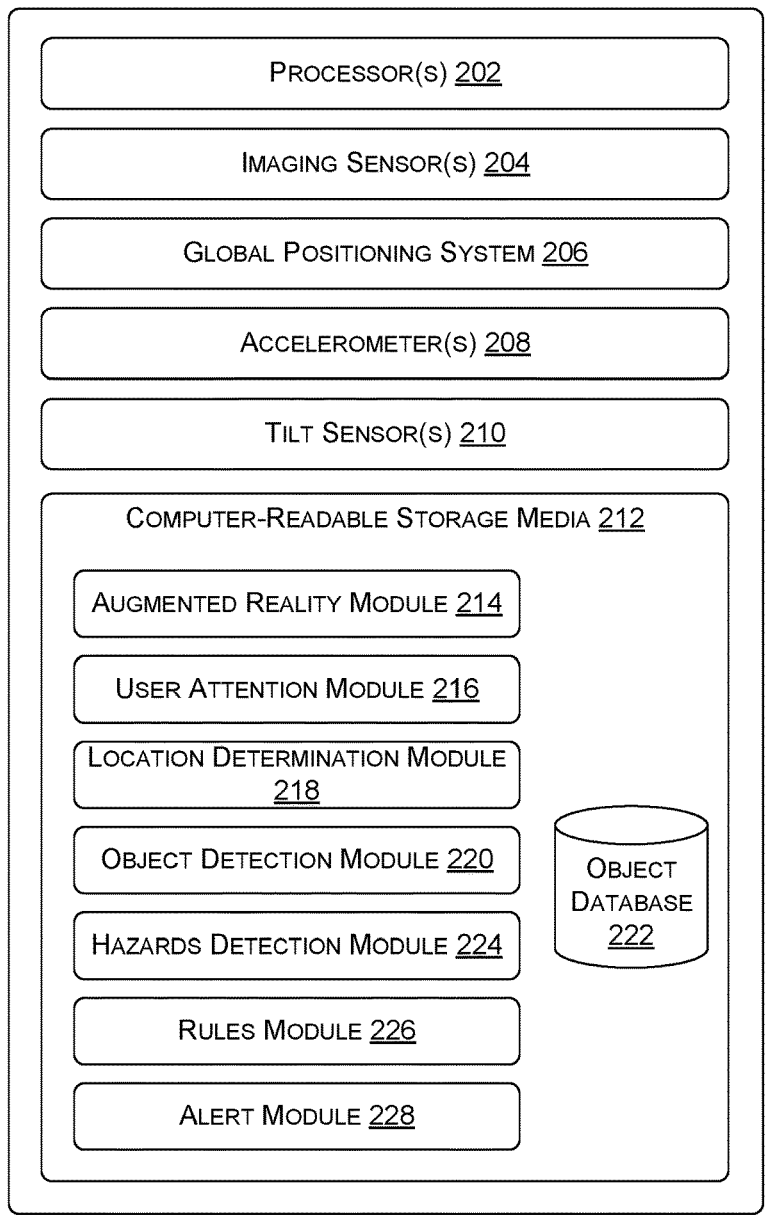
FIG. 2 illustrates a sample mobile communication device configured for hazard detection and notification.

FIG. 2 illustrates a block diagram of a mobile computing device 102 that can be used with the described collision avoidance system for augmented reality environments described herein. The mobile computing device 102 includes one or more processors 202. As described above, the one or more processors may include any suitable type of processor including, without limitation, central processing units or graphics processing units.

The mobile computing device 102 further includes one or more imaging sensors 204 configured to capture image data of the physical world within the vicinity of the mobile computing device 102. The one or more imaging sensors 204 may have overlapping fields of view, or may be disposed about the mobile computing device 102 such that their respective fields of view are non-overlapping. In some instances, the one or more imaging sensors 204 are positioned such that their respective fields of view are opposed to one another. That is, where there are two imaging sensors, they are pointed in approximately opposite directions. In other instances, two imaging sensors are pointed in approximately the same direction. In still other instances, multiple imaging sensors may be pointed in multiple directions to provide a panoramic field of view.

A global positioning system (GPS) 206 is provided and is able to capture location data. In some instances, the GPS 206 is additionally capable of capturing motion data, such as a direction and a velocity of the mobile computing device 102.

One or more accelerometers 208 may be provided and can be configured to generate motion data. In some cases, an accelerometer 208 can determine up and down motion of the mobile computing device 102, which may be used to determine that a user carrying the mobile computing device 102 is walking or running.

One or more tilt sensors 210 may be provided as part of the mobile computing device 102 and can be used to determine an angle at which the mobile computing device 102 is tilted. For example, the tile angle of the mobile computing device 102 may indicate that a user is holding the mobile computing device 102 in such a way as to view a display of the mobile computing device 102, such as when the user is engaged in an augmented realty environment.

The mobile computing device 102 further includes computer-readable storage media 212, which is non-transitory. The non-transitory computer-readable storage media 212 may include volatile and nonvolatile, removable and non-removable tangible, physical media implemented in technology for storage of information, such as computer readable instructions, data structures, program modules, or other data. System memory, removable storage, and non-removable storage are all examples of non-transitory computer-readable storage media. Non-transitory computer-readable storage media may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the processors 202.

The computer-readable storage media includes various instructions, routines, operations, and modules that, when executed, cause the processors to perform various activities. An augmented reality module 214 may store an AR application, which may include instructions that cause the processors 202 to initialize the one or more imaging sensors 204 and provide the superimposed computer-generated objects on the display. The AR application may be a game stored within the computer-readable storage media 212.

A user attention module 216 is configured to be able to ascertain when a user is paying attention to the display presented by the augmented reality module 214. There are several methods that can be utilized to determine the attention of the user. For example, the tilt of the mobile computing device 102 may indicate that the mobile computing device 102 is being held in an orientation for viewing. The tilt in combination with information from other wearable devices, such as a smart watch, for example, may indicate that the mobile computing device 102 and the smartwatch are within a predetermined distance of one another, thereby indicating that the mobile computing device 102 is being held in the hand associated with the wrist upon which the smart watch is being worn.

In addition, imaging data may be analyzed to determine that the head of the user is tilted forward, such as when looking down at the display screen. Imaging data may also be used to detect the eyes of the user and determine which direction the eyes of the user are looking, such as by using suitable eye tracking algorithms.

A location determination module 218, in conjunction with the GPS 206, can determine the location of the mobile computing device 102. Alternatively, the location determination module 218 may not rely on the GPS 206, but can rely upon the network 108 or the radio access provider 104 for location information. For example, the mobile computing device 102 may be triangulated through multiple towers associated with the radio access provider 104 to locate the mobile computing device 102.

An object detection module 220 is configured to detect and identify objects. In some instances, the object detection module 220 receives image data from the imaging sensors 204 and through suitable object detection algorithms, detects objects within the imaging data. The detected objects may be compared with known objects stored in an object database 222 to identify the objects. This may be performed, for example, by finding instances of real world objects in the imaging data by relying on edge detection algorithms, image segmentation algorithms, or superpixel algorithms, among others.

A hazards detection module 224 is configured to identify hazards within the vicinity of the mobile computing device 102. The hazards detection module 224 may utilize data from the object detection module 220 and the location determination module 218 to determine that a user holding the mobile computing device 102 is moving toward an obstacle, such as a fence. Hazards may be determined by the object detection module 220 by analyzing image data, or may be received from the carrier servers 110 that may provide data related to known hazards within the vicinity of the mobile computing device 102, or may be received from other wireless devices 106 or other mobile devices 122, or may be broadcast by NFC devices 136. Likewise, when mobile computing device 102 determines a hazard that meets predetermined criteria, it may send indications of the hazard to other wireless devices 106 or the carrier servers 110 for storage as a known hazard.

A rules module 226 is configured to apply rules as hazards are encountered. For example, where the mobile computing device 102 is approaching a hazard, such as a statue, if the user attention module 216 determines that the user is not paying attention to the mobile computing device 102, or if the augmented reality module 214 determines that the user is not engaged in an AR experience, then the rules may indicate that the mobile computing device 102 should take no action as the user approaches the statue. However, if the augmented reality module 214 determines that the user is engaged in an AR experience, and the user attention module 216 determines that the user is focusing on the display, then the rules module may take action as the user approaches the statue.

The rules module 226 may additionally store and execute geofencing rules. For example, a parent may establish rules for a child operating the mobile computing device 102 indicating that the child is able to engage in an AR experience, but that the child is not allowed to leave the front yard of the child's home. Geofencing rules may be established such that, as the child approaches the property boundary, the mobile computing device 102 takes some action to notify the child that the boundary is imminent.

For example, an alert module 228 may be activated and an alert may be provided to the child. The alert may be any suitable form of alert that notifies the child that the boundary is near, or that the boundary has been crossed. Such alerts may include a heads up display, or an augmented reality alert, in which the alert is presented as an augmented reality superimposition upon the display. Other types of suitable alerts may include one or more of an audible alert, a haptic alert, an alert on the display screen, or terminating the AR experience.

Figure 3:
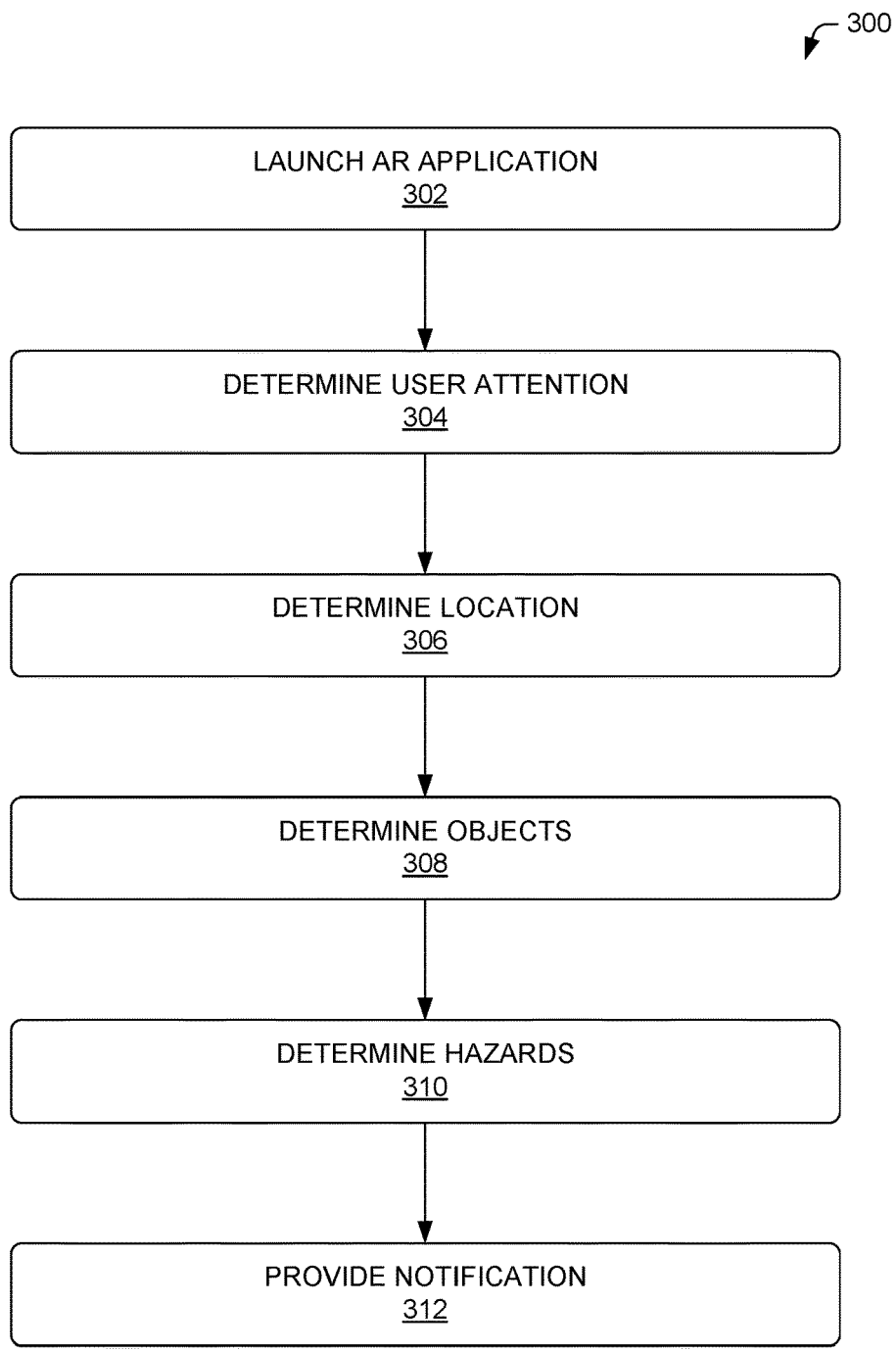
FIG. 3 illustrates an example process for providing a collision avoidance notification.
Figure 4:
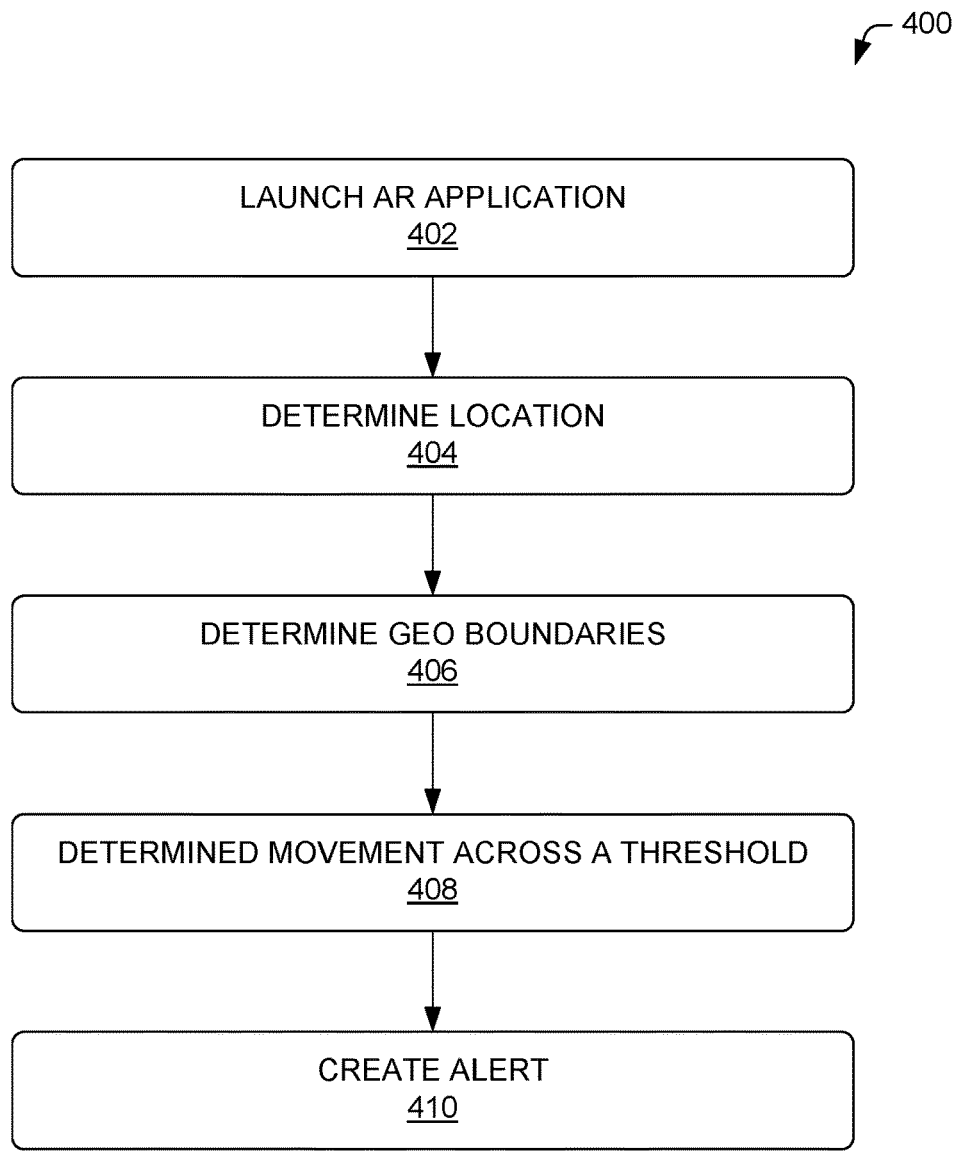
FIG. 4 illustrates an example process for a geo-boundary detection and alert.
Figure 5:
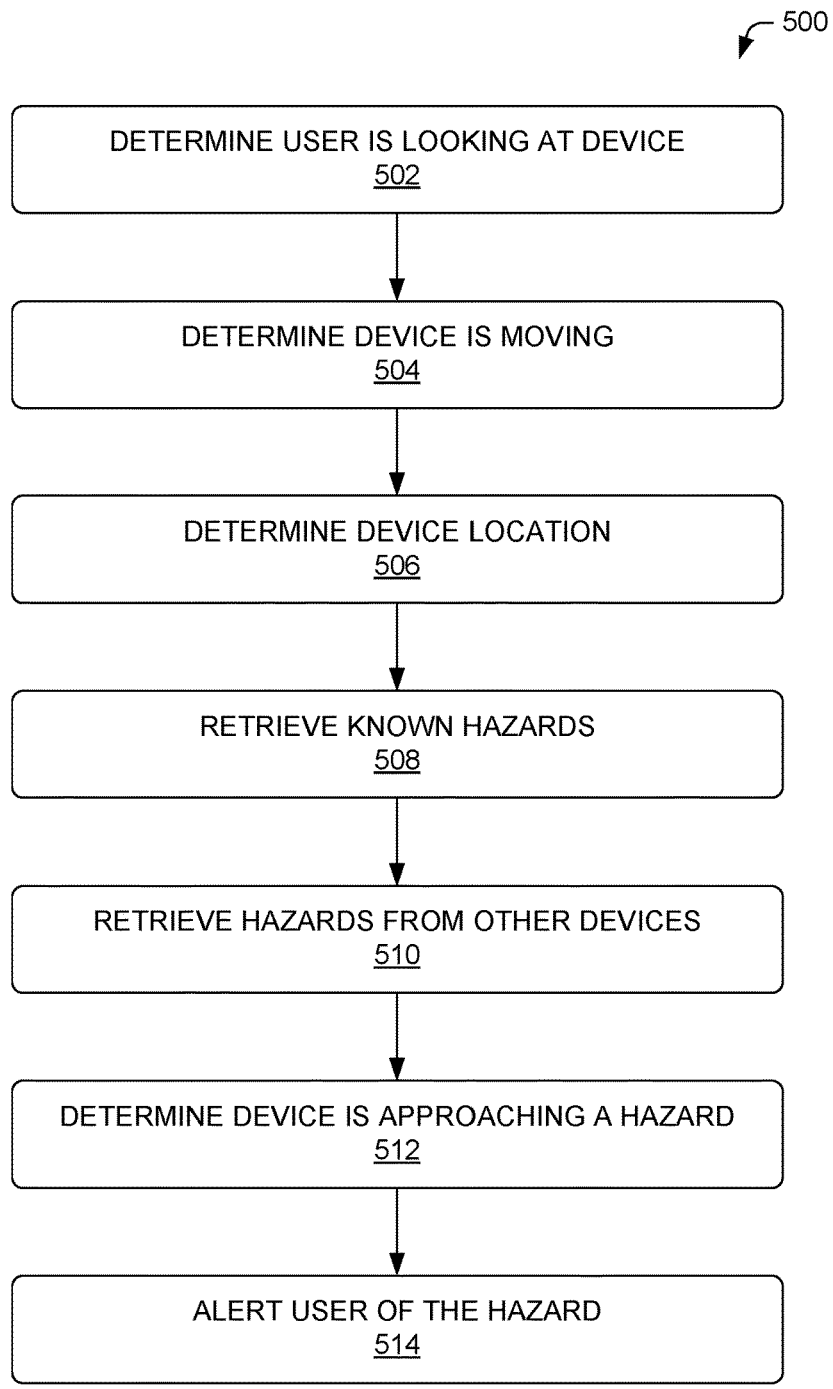
FIG. 5 illustrates an example process in which a wireless access carrier is able to leverage its agglomerated data to provide a hazard alert to a mobile device.

FIGS. 3-5 illustrate example processes of collision avoidance in augmented reality environments. These processes are illustrated as logical flow graph, each operation of which represents a sequence of operations that can be implemented in hardware, software, or a combination thereof. For example, the operations may be performed by the hardware shown and described in relation to the figures described herein. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. Moreover in some implementations, some of the illustrated operations may be omitted or may be performed on other devices as is described herein.

FIG. 3 illustrates an example process for collision avoidance and an AR environment. At block 302, an AR application is launched. This may be a game, a map application, a marketing application, or some other type of program in which augmented reality is implemented.

At block 304, the attention of the user is determined. As described, this may be based upon the posture of the user, the orientation of the mobile computing device 102, eye tracking algorithms, or through some other means.

At block 306, the location of the mobile computing device 102 is determined, such as by collecting GPS data. Additionally, motion data may be determined to ascertain how the mobile computing device 102 is moving, such as by determining whether a user is walking, running, is stationary, is riding a bicycle, or riding in a car.

At block 308, objects are determined. This may be performed through analyzing image data to recognize semantic instances of real world objects within the vicinity of the mobile computing device 102, receiving known objects from a local database or from a remote database by accessing the radio access provider 104 or the network 108, or by receiving known objects from devices within the vicinity of the mobile computing device 102 (e.g., NFC devices or peer-to-peer communication with local other wireless devices). The mobile computing device may interrogate changes in surface of the ground, such as a change from grass to rocks, or whether a curb or shrubberies are present in the path of the user. Machine vision algorithms may be implemented to capture and identify relevant instances of objects within imaging data generated by the mobile computing device. Additionally, machine learning algorithms may be used to improve the identification of objects within the imaging data generated by the mobile computing device.

At block 310, hazards are determined. This may be through identifying objects and determining that the objects may pose a hazard. Additionally, an indication of known hazards may be received from a local database or from a remote database by accessing the radio access provider 104 or the network 108, or by receiving known hazards from devices within the vicinity of the mobile computing device 102 (e.g., NFC devices or peer-to-peer communication with local other wireless devices). According to some examples, machine learning can be utilized to build virtual worlds based upon the real world objects detected to give additional spatial awareness to the system to assist the user in avoiding obstacles while focusing on the AR environment.

At block 312, a notification is provided. In some instances, the sensitivity of the process may be adjusted to only provide notifications in certain circumstances. For example, where a user is moving about a house, it may detract from an augmented reality experience if notifications were provided every time the user approached a wall, a couch, a table, or a chair. The sensitivity may also be adjusted based upon the day, the time of day, or on the AR activity the user is engaged in.

Other rules may be used to determine when and how a notification is presented. For example, a notification may only be presented if the system (1) determines that an AR application is executing, (2) the attention of the user is directed at the mobile computing device, (3) the user is walking, and (4) the user is approaching a hazard and is within a predetermined distance of the hazard, or within a predetermined time of colliding with the hazard based upon distance and velocity.

The notification may include a superimposition on the display, such as by indicating the hazard, through an audible warning, by terminating the augmented reality experience, or by some other suitable mechanism that warns the user of the hazard.

In some instances, the interaction with the AR application includes data that is sent from the mobile computing device to the radio access provider 104 and ultimately to the carrier servers 110. As the number of devices implementing the systems and methods described herein increases, the amount of data collected by the radio access provider 104 increases substantially. This data related to how the augmented reality experiences are used and the determined objects and hazards can be used to improve the user experience. For example, a database of known hazards can be populated based upon devices identifying hazards and providing this information to the radio access provider. Through crowd sourcing of this data collection, the experience can be improved for all the users.

Moreover, the radio access provider can determine the location of each device that is communicating through the radio access provider network. The radio access provider may use the location of its subscribers to influence the AR experience, such as by encouraging interaction between two or more subscribers within a common vicinity. The devices within a vicinity can also communicate peer-to-peer, such as to share indications of known hazards that each device has respectively identified.

FIG. 4 provides an example process of geofencing. At block 402, an AR application is launched, or the system determines that an AR application is currently executing on the mobile computing device.

At block 404, the location of the mobile computing device is determined, such as by receiving GPS data. Additionally, motion data may be collected that indicates movement of the mobile computing device, such as a direction and a velocity.

At block 406, boundaries are determined, which may be arbitrary, such as a radius around a location, or may be predetermined such as property lines, county lines, school district boundary lines, or some other such boundary.

At block 408, the system determines that the mobile computing device has moved across a threshold. In some instances, the threshold is the boundary line. In other instances, the threshold is a predetermined distance from a boundary line as the mobile computing device approaches the boundary line.

At block 410, an alert is created and provided. In the case where the AR application is a game, the alert may include terminating the game, or providing a visual, audible, or haptic notice that the user has crossed the threshold. As the mobile computing device moves away from the boundary within the geofenced area, the AR application may begin executing and the AR experience is resumed.

FIG. 5 illustrates a process for collision avoidance from the perspective of the carrier servers. At block 502, the mobile computing device determines that the attention of the user is focused on the mobile computing device. This may be done by utilizing hardware associated with the mobile computing device, such as tilt sensors, accelerometers, imaging data, and the like.

At block 504, motion of the mobile computing device is determined. This may be determined to indicate a direction and a velocity that the mobile computing device is moving, and also whether the user is walking, running, stationary, riding a bicycle, or moving in some other fashion.

At block 506, the location of the mobile computing device is determined, such as through GPS data.

At block 508, known hazards are retrieved. These may be retrieved from a database of known hazards maintained on the carrier servers. They may additionally be retrieved through geofencing. For example, a geofence may be predefined to create a virtual boundary within a predetermined distance from a cliff. When a mobile computing device approaches the cliff and other rules are satisfied (e.g., it is determined that the attention of the user is focused on the AR environment), an alert may be created to warn the user of the danger.

At block 510, hazards from other devices are retrieved, such as through interrogating NFC devices or by requesting local known hazards of other wireless devices within the vicinity of the mobile computing device. The carrier servers are able to determine the location of its subscribers that use the radio access provider's network for voice or data communications and retrieve any hazards determined by those additional devices. This data may be sent to the carrier servers and stored and made available to other mobile computing devices. Other users may proactively report hazards associated with a location to the carrier servers for storage and subsequent delivery to other mobile computing devices.

At block 512, the system determines that the device is approaching a hazard. This is, in many instances, determined by location data and motion data in combination with the location and identification of known hazards. In some instances, machine vision of the mobile computing device can be used to determine hazards on the fly and provide the appropriate notification to the user.

At block 514, the user is alerted of the hazard. As described above, the notification may be through exiting the AR environment, or providing audible, visual, or haptic feedback to the user. In any event, the notification is geared to safeguard the user from the hazard.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method of collision avoidance in an augmented reality environment, comprising:
    determining that an augmented reality application is executing on a mobile computing device; and
    based at least in part on determining that the augmented reality application is executing on the mobile computing device,
        determining, based at least in part on imaging data representing at least a portion of an image of a user associated with the mobile computing device, that the user is looking at the mobile computing device,
        determining a location of the mobile computing device,
        receiving, from a database that is maintained by a wireless carrier associated with the mobile computing device, hazard data,
        identifying, based at least in part on the hazard data, one or more hazards within a predetermined distance of the location,
        determining that the mobile computing device is approaching at least one of the one or more hazards, and
        generating a notification of the at least one of the one or more hazards in response to determining that the user is looking at the mobile computing device.

2. The method of claim 1, wherein the database is remote from the mobile computing device.

3. The method of claim 1, wherein identifying, as the one or more identified hazards and based at least in part on the hazard data, the one or more hazards comprises capturing image data from an image sensor associated with the mobile computing device.

4. The method of claim 1, wherein generating the notification comprises exiting the augmented reality application.

5. The method of claim 1, wherein generating the notification is provided by one or more of haptic, audio, or visual feedback.

6. An electronic device, comprising:
    one or more processors;
    an accelerometer;
    an imaging sensor; and
    one or more memories coupled to the one or more processors, the one or more memories having instructions stored thereon that, when executed by the one or more processors, cause the one or more processors to:
    determine that the one or more processors are executing an augmented reality application;
    receive motion data from the accelerometer;
    determine, based at least in part upon the motion data, that the electronic device is moving;
    receive imaging data from the imaging sensor representing at least a portion of an image of a user associated with the electronic device;
    determine, based at least in part upon the imaging data, that the user associated with the electronic device is looking at the electronic device;
    receive, from a database that is maintained by a wireless carrier associated with the electronic device, an indication of one or more hazards within a predetermined distance of the electronic device;
    determine that the user associated with the electronic device is approaching at least one of the one or more hazards; and
    in response to determining that the one or more processors are executing the augmented reality application and in response to determining that the user is looking at the electronic device, provide a notification indicating presence of the at least one of the one or more hazards.

7. The electronic device of claim 6, wherein the motion data indicates that the user associated with the electronic device is walking.

8. The electronic device of claim 6, wherein the instructions cause the one or more processors to analyze the imaging data with an object recognition algorithm.

9. The electronic device of claim 8, wherein a gaze of the user is determined by the object recognition algorithm.

10. The electronic device of claim 8, wherein the object recognition algorithm identifies at least one of the one or more hazards.

11. The electronic device of claim 6, wherein the instructions cause the one or more processors to retrieve an identification and location of at least one of the one or more hazards from a hazards database.

12. The electronic device of claim 6, wherein the instructions cause the one or more processors to receive an identification and location of at least one of the one or more hazards through a near field communication signal.

13. The electronic device of claim 6, wherein the notification is one or more of haptic, audible, or visual feedback.

14. A method for collision avoidance, comprising:
determining that a mobile computing device is in motion;
determining, based at least in part on imaging data representing at least a portion of an image of a user associated with the mobile computing device, that the user is looking at the mobile computing device;
determining a location of one or more hazards within a predetermined distance of the mobile computing device;
determining that the mobile computing device is approaching at least one of the one or more hazards;
in response to determining that the user is looking at the mobile computing device, providing a notification of the at least one of the one or more hazards; and
sending the location of the at least one of the one or more hazards to a database that is maintained by a wireless carrier associated with the mobile computing device.

15. The method of claim 14, further comprising receiving, from a second mobile computing device, an indication of a hazard and adding the indication of the hazard to a hazard database.

16. The method of claim 14, wherein determining the one or more hazards comprises receiving, at the mobile computing device, a near field communication signal indicating a hazard.

17. The method of claim 14, wherein determining the one or more hazards comprises receiving, at the mobile computing device, data from a news feed source.

18. The method of claim 14, wherein determining the one or more hazards comprises creating a virtual boundary around the mobile computing device.

19. The method of claim 14, wherein determining that the user associated with the mobile computing device is looking at the mobile computing device is based, at least in part, on tilt data generated by a tilt sensor associated with the mobile computing device.

20. The method of claim 14, further comprising generating a three-dimensional spatial model that indicates the one or more hazards.

* * * * *